Aug. 15, 1939.  L. G. COPEMAN  2,169,225
PROTECTIVE COATING AND PROCESS OF APPLYING AND REMOVING
Original Filed Nov. 4, 1935

INVENTOR.
Lloyd G. Copeman
BY
Barnes, Kisalle, Laughlin & Raisch
ATTORNEYS

Patented Aug. 15, 1939

2,169,225

UNITED STATES PATENT OFFICE 2,169,225

PROTECTIVE COATING AND PROCESS OF APPLYING AND REMOVING

Lloyd G. Copeman, Flint, Mich., assignor to Copeman Laboratories Company, Flint, Mich., a corporation of Michigan Application November 4, 1935, Serial No. 48,125, which is a division of application Serial No. 593,279, February 16, 1932, now Patent No. 2,020,255, dated November 5, 1935. Divided and this application June 4, 1937, Serial No. 146,466

5 Claims. (Cl. 280—153.5)

This invention relates to protective coatings and process of applying and removing, and has to do particularly with coatings adapted to be applied between articles of manufacture to act as an anti-squeak material.

This application is a division of my copending application Serial No. 48,125, filed November 4, 1935, which in turn is a division of application Serial No. 593,279, filed Feb. 16, 1932, now matured into Patent No. 2,020,255.

The idea of applying a temporary, readily peelable coating such as latex to articles as disclosed by Van Deventer Reissue 18,734 and, as disclosed in my copending application Serial No. 597,013, such temporary latex coatings were improved by the use of a backing material with a thin layer of plastically applied latex or similar aqueous dispersion of rubber, said backing material bonding to the latex when set up to form a tough protective coating and to make such protective coating easily removable in large sheets.

The subject matter of the present invention, which is a division of application No. 48,125, has to do with the application of an aqueous dispersion of rubber, such as latex or any other solution containing a solvent, which will set up in the form of a coating to the surface of an article so as to act as an anti-squeak material when the surface of said article is placed adjacent the surface of another article to form a completed product.

Some modifications of the invention embody the step of applying or utilizing a backing coating such as a dry aggregate which permits the use of but a single thin layer of deposited rubber and which not only accelerates the setting up of the latex or the like but which assists in the removal of the temporary protective coating.

The coating material as used in the present process may vary considerably, but in most cases I preferably use a coating material which is held in solution by a solvent or any other suitable carrying agent. This solution may be any of the various lacquers or aqueous dispersions of rubber, such as latex and, as will be later pointed out, such rubber dispersions may be so loaded with a filler as to be very plastic and just barely pour.

The aqueous dispersion of rubber or other coating agent may, of course, have various concentrations and may be combined with cheaper fillers such as clay. For instance, a mixture of latex and two hundred mesh clay will make a very desirable coating which is so thick that it will hardly pour but which may be easily sprayed upon the article to be coated. Regardless of the kind of coating material used, and whether temporary or permanent, I preferably accelerate the setting up action and the completion of the finished coating by adding a dry secondary coating material either with the plastically applied coating material or on top of the layer or layers of plastically applied coating material. This accelerating coating material may be paper, wood flour, ground rubber, cotton dust, etc.

Figure 1:
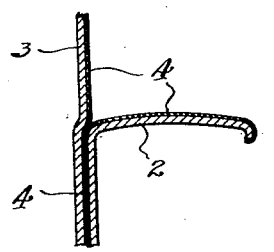
Figs. 1 and 2 illustrate the assembly of two separately coated articles according to the present process when a portion of the coating is a temporary one and is removable as shown in Fig. 2 and the remainder of the coating firmly positioned between the two articles.
Figure 2:
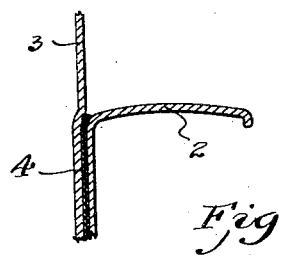

In coating automobile parts, such as shown in Figs. 1 and 2, I may first spray a complete fender 2 with a coating substance which may be in solution or plastic state. This initial coating may be applied by dipping in the usual manner or, as disclosed in my application Serial No. 593,279, filed February 16, 1932, and now issued as Patent No. 2,020,255, the coating solution such as latex may be first applied to paper and the coated side of the paper, while still plastic, then applied to the fender, but in the present invention I preferably spray the finished coating on the surface to be protected. While the initially applied coating is still wet I apply the backing material such as paper, wood flour, or finely ground rubber. This backing material adheres to the relatively sticky surface of the initial coating and such backing material materially accelerates the setting up time of the coating by absorbing or at least assisting by absorption or capillarity in evaporating the solvent or carrying agent such as water in the case of latex.

For the typical single coating for fenders, automobile bodies and similar articles, I may complete the coating by applying a second layer of coating material which is preferably latex. Suitable accelerators may be combined with this final layer of latex or other coating material to assist in the setting up action.

I have found that if a filler such as clay is added to the aqueous dispersion of rubber or other coating material it is comparatively difficult to peel the coating from the surface, but that if a backing material of wood flour, paper, or similar dry aggregate or coating material is added to the surface of the coating while still wet, the resulting coating may be easily peeled off in large strips. In other words, regardless of the particular type or kind of initial coating material used, the adding of the backing material helps materially in the setting up of the coating, in adding sufficient body to make the coating easily stripped off in large sheets, and in building up a protective coating of sufficient resilience and body which is materially cheaper than the same thickness of coating built up from successive layers of the base coating material. The wood flour, ground rubber or other backing material is less expensive than the original coating material and the use of such backing material presents a much superior coating so that built up from the successive layers of latex or the like.

Figure 3:
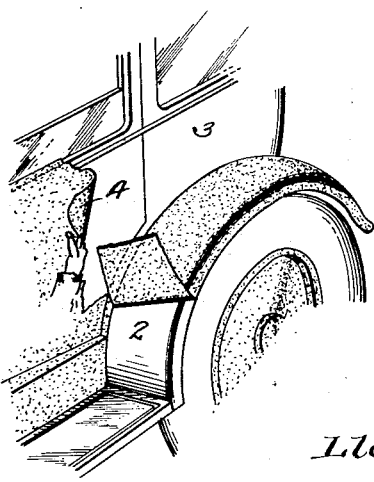
Fig. 3 illustrates a portion of an automobile and fender and the manner of removal of the coating.

Regardless of the particular ingredients and specific method of application of the temporary protective coating, one of the important features of the present application resides in the protective coating of various parts which go into the making up or assembling of a complete article. For instance, referring particularly to Fig. 1, the fender 2 may be coated with a layer of latex and a layer of ground rubber, the body 3 of the automobile may be coated similarly. The fender may be then shipped to the body plant or both the body and fenders shipped to an assembly plant and the fender bolted to the body in the usual manner, both articles, of course, receiving protection during such shipping, handling, and assembly; the manner of coating preferably being such as not to cover up the respective bolt holes of the two articles. The remainder of the automobile may then be assembled and shipped or driven to its destination after which the exposed portions of the temporary protective coating material 4 may be removed, as best illustrated in Figs. 2 and 3, leaving the two layers of material 4 between the assembled fender and the body to act as an anti-squeak material.

I claim:

1. An anti-squeak strip for use between a vehicle body and fender, comprising laminations of rubber and fibrous material formed by applying to said body and said fender alternate coats of an aqueous dispersion of rubber and a fibrous material, and allowing the same to solidify.

2. An anti-squeak strip for use between a vehicle body and fender, comprising laminations of rubber formed by coating said body and fender with an aqueous dispersion of rubber and allowing the rubber to deposit from said aqueous dispersion.

3. An anti-squeak strip for use between adjacent structural parts comprising a laminated strip formed of a plurality of superimposed layers of fibrous material impregnated with a latex compound rendering the material water resistant.

4. An anti-squeak strip for use between the surfaces of metal parts going into the fabrication and manufacture of a completed article comprising a plurality of superimposed layers of rubber coating formed from an aqueous dispersion of rubber and a coating of liquid absorbent material applied to the surfaces of respective articles, said material being bonded with the rubber coating to form a flexible water resistant coating.

5. As a new article of manufacture, an anti-squeak strip for use between a vehicle body and fender comprising a plurality of superimposed coatings of rubber applied as an aqueous dispersion, and coatings of a liquid absorbent fibrous material bonded with the rubber coating.

LLOYD G. COPEMAN.